United States Patent [19]
Jackson

[11] Patent Number: 6,080,368
[45] Date of Patent: *Jun. 27, 2000

[54] OPEN SYSTEM SULFUROUS ACID GENERATOR

[76] Inventor: Edward Jackson, 3745 S. Haven Way, Salt Lake City, Utah 84109

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/131,121

[22] Filed: Aug. 7, 1998

[51] Int. Cl.$^7$ .................................................. C01B 17/48
[52] U.S. Cl. ........................ 422/161; 422/160; 422/189; 423/522

[58] Field of Search ..................................... 422/161, 169, 422/170, 172, 189, 160, 129, 171, 224, 225, 228; 210/192; 423/522, 532

[56] References Cited

U.S. PATENT DOCUMENTS

| 353,222 | 11/1886 | Hughes | 422/161 |
| 1,865,607 | 7/1932 | Allen | 422/161 |

*Primary Examiner*—Marian C. Knode
*Assistant Examiner*—Susan Ohorodnik
*Attorney, Agent, or Firm*—Kirton & McConkie

[57] ABSTRACT

This invention presents a sulphurous acid generator which employs a combination of novel blending contact and mixing mechanisms which maximize the efficiency and duration of contact between sulphur dioxide gas and water to form sulphurous acid in an open nonpressurized system, without employing a countercurrent absorption tower.

1 Claim, 5 Drawing Sheets

OPEN SYSTEM SULFUROUS ACID GENERATOR

BACKGROUND OF THE INVENTION

1. The Field of the Invention

Only a fraction of the earth's total water supply is available and suitable for agriculture, industry and domestic needs. The demand for water is great and new technologies together with growing populations increase the demand for water while pollution diminishes the limited supply of usable water. The growing demand for water requires efficient use of available water resources.

Agricultural use of water places a large demand on the world's water supply. In some communities, the water supply may be adequate for farming but the quality of the water is unsuitable for agriculture because the water is alkaline. Alkalinity is an important factor affecting the quality, efficiency and performance of soil and irrigation water. A relative increase in irrigation alkalinity due to the water's sodium to calcium ratio or a high pH renders irrigation water detrimental to soil, crop growth and irrigation water efficiency. Such water can be reclaimed for soil rehabilitation and irrigation by adding lower pH sulphurous acid to the alkaline water to reduce its alkalinity or pH.

The invention of this application is directed toward a device which generates sulphurous acid in a simplified, efficient way. In particular, it is directed toward a sulphurous acid generator which produces sulphurous acid by burning sulphur to produce sulphur dioxide gas. The sulphur dioxide gas is then drawn toward and held in contact with water eventually reacting with the water and producing sulphurous acid, while substantially reducing dangerous emissions of sulphur dioxide gas to the air.

2. The Relevant Technology

There are several sulphurous acid generators in the art. The prior art devices utilize sulphur burn chambers and absorption towers. However, known systems utilize countercurrent current flow or pressurized systems as the principle means to accomplish the generation of sulphurous acid. For example, many devices employ the absorption tower to introduce the majority of the water to the system in countercurrent flow to the flow of sulphur dioxide gas. U.S. Pat. No. 4,526,771 teaches introducing 90% of the system water for the first time in countercurrent flow at the top of the absorption tower. In such devices, the integrity of the absorption towers is vital, and any deficiencies or inefficiencies of the absorption tower lead to diminished reaction and results. Other devices utilize pressurized gas to facilitate flow of gas through the system, see U.S. Pat. No. 3,226,201. Pressurized devices, however, require expensive manufacture to ensure the containment of dangerous sulphur dioxide gas to avoid leakage. Even negative pressure machines have the drawback of requiring a source of energy to power the negative pressure generator such as an exhaust fan. Still other devices rely upon secondary combustion chambers to further oxidize the sulphur, see U.S. Pat. No. 4,526,771. Many sulphurous acid generators emit significant or dangerous levels of unreacted sulphur dioxide gas, a harmful and noxious pollutant, into the surrounding environment.

SUMMARY AND OBJECTS OF THE INVENTION

The present invention is directed to a sulphurous acid generator which can be used to improve alkaline irrigation water by adding the sulphurous acid produced by the generator to alkaline water to reduce the alkalinity and/or pH of the water. In addition to making the water less alkaline, adding sulphurous acid to alkaline water increases the availability of sulphur in the water to act as a nutrient, improves capillary action of the soil, increases cation exchange capacity, and decreases tail water run-off and tillage and fertilizer costs.

In many agricultural settings, complicated farm machinery is not practical because it requires technical training to operate and special skills to service and maintain. For sulphur generators, improved design can reduce costs, simplify operation, service and maintenance and increase efficiency and safety thereby making the machine more practical for agricultural use. The present invention is directed toward a sulphurous acid generator that is simple to produce, operate, service and maintain, and which efficiency produces, contains and reacts sulphur dioxide gas and sulphurous acid without exposing the user or other living things in proximity to the machine to dangerous sulphur dioxide emissions.

It will be appreciated that a specific energy source is not necessarily required by the present invention, and therefore its use is not necessarily restricted to locations where a particular power source, like electricity, is available or can be generated for use. All of the above objectives are met by the present, invention.

Unlike the prior art, the present invention is designed to maximize the amount of water in contact with sulphur dioxide gas and the duration of the contact of water with sulphur dioxide gas without creating back pressure in the system or relying upon pressurization of the gas to cause the sulphur dioxide gas to flow through the sulphurous acid generator. This reduces the complexity of the sulphurous acid generator and the need for additional equipment such as air compressors used by prior art devices.

The invention primarily relates to a sulphur hopper, a burn chamber, a gas pipeline, a mixing tank, and an exhaust pipeline.

The sulphur hopper preferably has a capacity of several hundred pounds of sulphur in powder or flake form. The sulphur hopper can be constructed of various materials or combinations thereof In the preferred embodiment, the sulphur hopper is constructed of stainless steel and plastic. The sulphur hopper is connected to the burn chamber by a passageway positioned at the base of the sulphur hopper. The conduit joins the bum chamber at its base. The weight of the sulphur in the sulphur hopper forces sulphur through the passageway at the base and into the bum chamber, providing a continual supply of sulphur for burning. The flow of sulphur may be augmented using an anti-cavitation rake or scraper.

The burn chamber has an ignition inlet on the top of the burn chamber through which the sulphur is ignited and an air inlet on the side of the chamber through which oxygen enters to fuel the burning sulphur. The burning sulphur generates sulphur dioxide gas. In the preferred embodiment, the bottom of the chamber is removable, facilitating access to the chamber for maintenance and service. The burn chamber is constructed of material capable of withstanding the corrosiveness of the sulphur and the heat of combustion, preferably stainless steel.

Sulphur dioxide gas exits the burn chamber through an exhaust outlet on the top of the burn chamber and is drawn into a first conduit. The first conduit may be manufactured from stainless steel.

A supply of water is conducted by a second conduit and may be brought from a water source through the second conduit by any means capable of delivering sufficient water and pressure, such as an elevated water tank or a mechanical or electric pump.

The first conduit and second conduit meet and couple with a third conduit. The third conduit comprises a blending portion, a contact containment portion, an agitation portion and a means for discharging the sulphurous acid and unreacted sulphur dioxide gas. In the third conduit, the sulphur dioxide gas and water are brought in contact with each other to form sulphurous acid. The third conduit may be constructed of polyethylene plastic.

The blending portion of the third conduit comprises a means for bringing the sulphur dioxide gas in the first conduit and the water in the second conduit into contained, codirectional flow into contact with each other. The majority of water used to create sulphurous acid in the system and method is introduced into the third conduit and flows through one or more contact containment and agitation portions in the third conduit through the contact means. Thereafter, the water and sulphur dioxide gas flow through one or more contact containments, discharging naturally by gravity into a mixing tank.

Water is introduced into the third conduit in co-directional flow with the sulphur dioxide gas so as to create an annular column of water with the sulphur dioxide gas flowing inside the annular column of water thereby blending the water and sulphur dioxide gas together. In the preferred embodiment, water is introduced into the gas pipeline and passes through an eductor, which causes sulphur dioxide gas to be drawn through the first conduit without the need of pressuring the sulphur dioxide gas and without using an exhaust fan. The water and sulphur dioxide gas remain in contact with each other for the period of time it takes to flow through a portion of the third conduit. In the contact area, a portion of the sulphur dioxide gas reacts with the water, creating sulphurous acid.

The agitation portion comprises a means for mixing and agitating the codirectionally flowing sulphur dioxide gas and water/sulphurous acid. The agitation portions enhance sulphur dioxide gas reaction and dispersion. Bends in the third conduit or obstructions within the third conduit are contemplated as possible means for mixing and agitating in the agitation portion. Agitation of the co-directional flow of the sulphur dioxide gas and water further facilitates reaction of the sulphur dioxide gas with water into a mixing pool. Sulphurous acid and sulphur dioxide gas flow out of the third conduit through means for discharging the sulphurous acid and unreacted sulphur dioxide gas.

A discharge outlet represents a possible embodiment of means for discharging the sulphurous acid and unreacted sulphur dioxide gas. The discharge outlet permits conduit contents to enter a gas submersion zone.

The sulphurous acid and unreacted sulphur dioxide gas exit the third conduit through the discharge and enter a mixing tank. In one embodiment, a weir divides the mixing tank into two sections, namely a pooling section and an effluent or outlet section. Sulphurous acid and sulphur dioxide gas exit the discharge of the third conduit into the pooling section. As the sulphurous acid pours into the mixing tank, it creates a pool of sulphurous acid equal in depth to the height of the weir. At all times, the sulphurous acid and unreacted sulphur dioxide gas discharge from the third conduit above the level of the liquid in the pooling section of the mixing tank.

In other words, the discharge from the third conduit is positioned sufficiently above the surface of the pool, so that sulphur dioxide gas exiting the pipeline can pass directly into and be submerged within the pool while in an open (nonclosed) arrangement. In other words, the discharge from the third conduit does not create any significant back pressure on the flow of sulphurous acid or sulphur dioxide gas in the third conduit or gas pipeline. Nevertheless, the close vertical position of the discharge from the third conduit above the surface of the pool reduces the likelihood that the unreacted sulphur dioxide gas will exit from the discharge without being submerged in the pool. The discharge is removed a distance from the sidewall of the mixing tank toward the center of the pooling section to allow the pool to be efficiently churned by the inflow of sulphurous acid and unreacted sulphur dioxide gas from the third conduit.

As acidic water and gas continue to enter the mixing tank from the third conduit, the level of the pool eventually exceeds the height of the weir. Sulphurous acid spills over the weir and into the effluent or outlet section of the mixing tank where the sulphurous acid exits the mixing tank through an effluent outlet. The top of the effluent outlet is positioned below height of the weir and the discharge from the third conduit in order to reduce the amount of free floating unreacted sulphur dioxide gas exiting the chamber through the effluent outlet. Free floating, unreacted sulphur dioxide gas remaining in the mixing tank rises up to the top of the mixing tank. The top of the mixing tank is adapted with a lid. Under dissolved sulphur dioxide bubbles flowing through the affluent outlet are trapped by a standard u-trap, forcing accumulated bubbles back into the mixing tank while sulfurous acid exits the system through a first discharge pipe.

To ensure further elimination of any significant emissions of sulphur dioxide gas from the generator into the environment, the sulphur dioxide gas remaining in the mixing tank may be drawn into an exhaust conduit coupled with an exhaust vent on the lid of the mixing tank. The exhaust conduit defines a fourth conduit. Positioned in the fourth conduit is a means for introducing water into the fourth conduit. The water which enters the fourth conduit may be brought from a water source by any means capable of delivering sufficient water to the fourth conduit. As the water is introduced into the fourth conduit, it reacts with the sulphur dioxide gas that has migrated out through the lid of the mixing tank of the absorption tower, and creates sulphurous acid.

In the preferred embodiment, water introduced into the fourth conduit, passes through a second eductor causing the sulphur dioxide gas to be drawn through the vent and into the fourth conduit. The gas and water are contained in contact as they move through one or more contact containment and/or agitation portions of the fourth conduit. Sulphurous acid exits the fourth conduit through a second discharge pipe. In a preferred embodiment, the second discharge pipe also comprises a u-trap configuration, upstream from the u-trap, a thin stack permits reactive gases to discharge from the system.

The fourth conduit may be constructed of high density polyethylene plastic. High density polyethylene plastic is preferred for its durability and resistance to ultra violet ray degradation. It is another object of this invention to eliminate the countercurrent absorption powers of the prior art.

As mentioned, the water introduced into the system to the third conduit and fourth conduit may be brought from a water source to the system by any means capable of delivering sufficient water and pressure, such as a standing, elevated water tank, or mechanical, electric or diesel powered water pump.

It is an object of this invention to create a sulfurous acid generator that is simple to manufacture, use, maintain and service.

It is further an object of this invention to create a sulfurous acid generator that is capable of operating without any electrical equipment such as pumps, air compressor or exhaust fans requiring a specific energy source requirement, such as electricity or diesel fuels.

It is another object of this invention to produce a sulphurous acid generator which converts substantially all sulfur dioxide gas generated into sulphurous acid.

It is another object of the invention to produce a sulfurous acid generator which uses an induced draw created by the flow of water through the system to draw gases through the otherwise open system.

Another object of the present invention is to provide a sulphurous acid generator with one or more contact containment and/or agitation and mixing mechanisms to increase the duration of time during which the sulphur dioxide gas is in contact with and mixed with water.

It is an object of this invention to produce a sulphurous acid generator which substantially eliminates emission of harmful sulphur dioxide gas.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly depicted above will be rendered by reference to a specific embodiment thereof which is illustrated in the appended drawings. With the understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
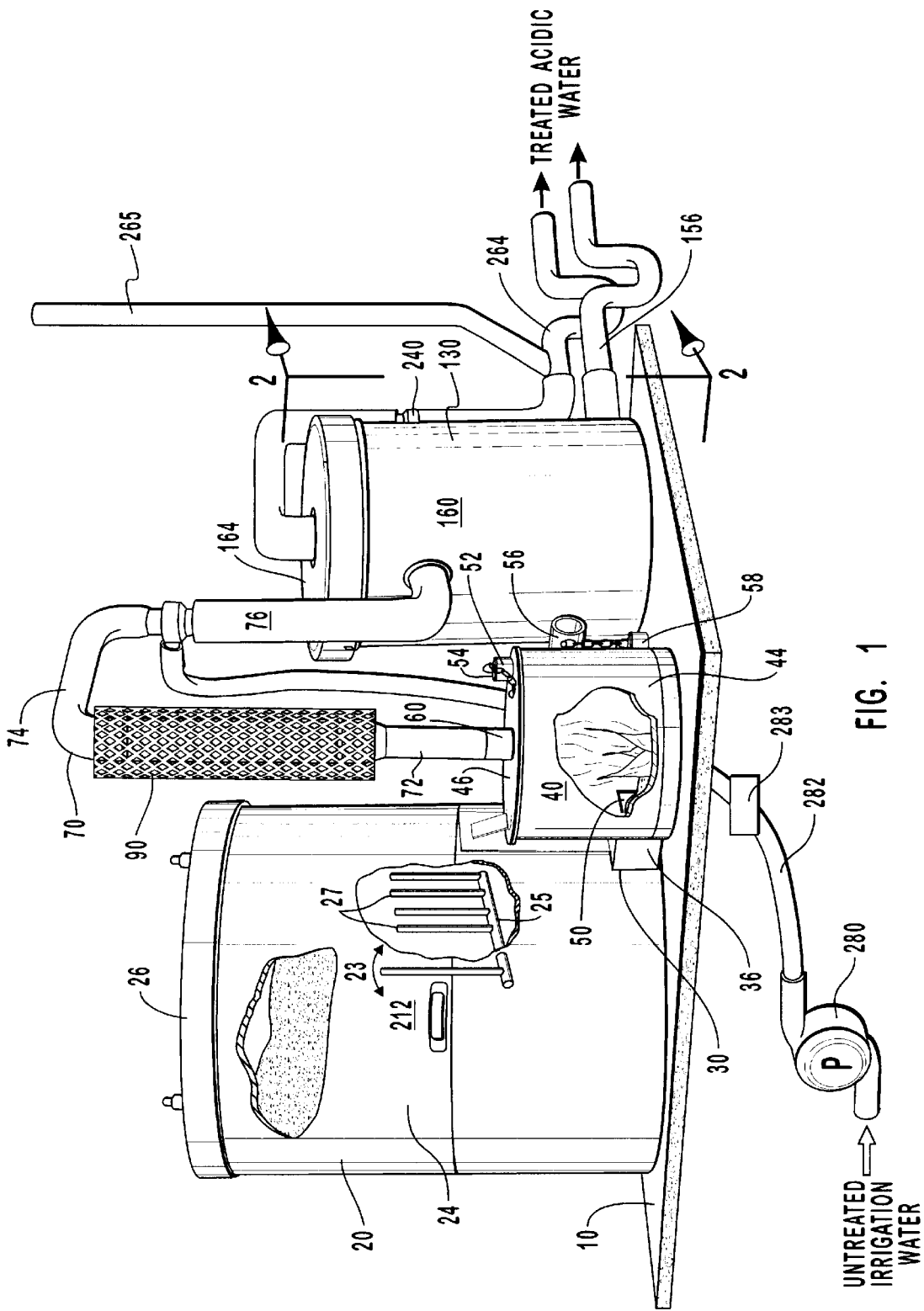
FIG. 1 is a perspective view of one embodiment of the sulphurous acid generator.
Figure 2:
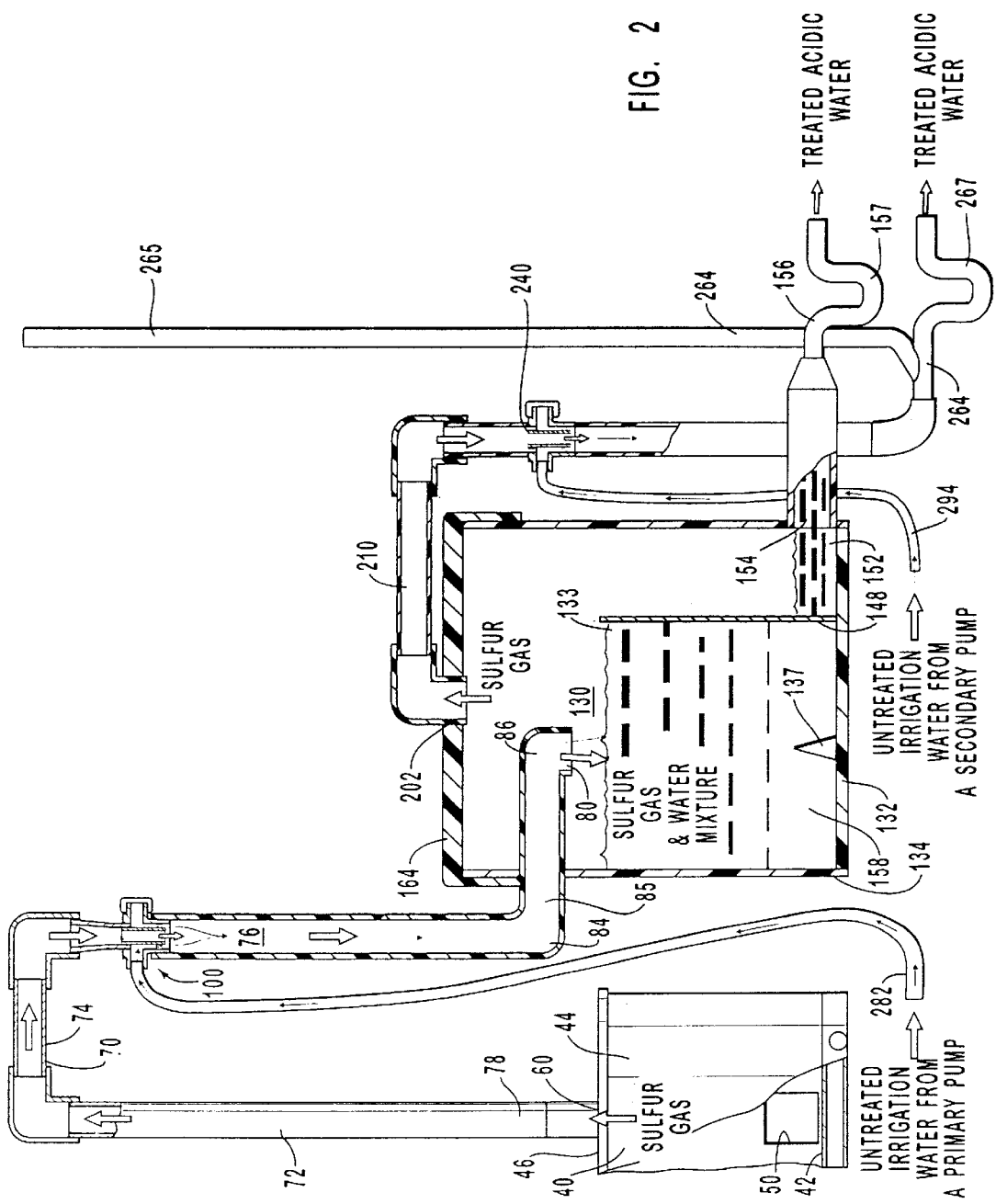
FIG. 2 is a side elevation view partly in cutaway cross-section of the components of the sulphurous acid generator.

Including by reference the figures listed above, applicant's sulfurous acid generator comprises a system which generates sulphur dioxide gas and keeps the gas substantially contained and in contact with water for extended periods of time substantially, eliminating any significant release of harmful sulphur dioxide gas from the system. As shown in FIGS. 1 and 2, the principle elements comprise a sulphur hopper 20, a burn chamber 40, a gas pipeline 70, a mixing tank 130, and an exhaust conduit 210. The principle elements are mounted on a platform 10 to facilitate transport.

The sulphur hopper 20 comprises enclosure 24 with a top surface 26. The top surface 26 defines a closeable aperture, not shown. Enclosure 24 may be of any geometric shape; cylindrical is shown, rectangular may also be employed. Surface 26 of enclosure 24 comprises a closeable aperture of sufficient diameter and shape to allow sulphur to be loaded into the hopper 20. The enclosure 24 defines a hopper outlet 30. The hopper 20 is configured such that sulphur in the hopper 20 is directed toward the hopper outlet 30 by the pull of gravity. The hopper outlet 30 allows sulphur to pass through and out of the hopper 20.

A passageway conduit 36 communicates between the hopper outlet 30 a burn chamber inlet 50 of the burn chamber 40.

In an alternative embodiment, enclosure 24 may include a rocker arm 21 mounted external of enclosure 24. Rocker arm 21 is capable of being moved back and forth as shown by arrow 23. Connected to substantially vertical rocker arm 21, and extending internal to enclosure 24, is bar 25 having substantially upward extending of fingers 27. Fingers 27 extend upward into the sulphur supply such rocker arm 23 can be manipulated back and forth, thereby manipulating or raking fingers 27 back and forth to aviate incavitation of sulphur that may occur in hopper 20.

The burn chamber 40 comprises a floor member 42, a chamber sidewall 44 and a roof member 46. The floor member 42 defines a perimeter and the floor member 42 is removably attached to the chamber sidewall 44. The roof member 46 is secured to the chamber sidewall 44, the chamber sidewall 44 supporting the roof member 46. An ignition inlet 52 defined by the roof member 46 has a removably attached ignition inlet cover 54. An air inlet 56 defined by the chamber sidewall 44 has a removably attached air inlet cover 58. The air inlet 56 is positioned substantially opposite to the conduit inlet 50 and may enter the chamber sidewall 44 tangentially. An exhaust opening 60 in the burn chamber 40 is defined by the roof member 46.

Sulphur supplied to the burn chamber 40 through the conduit inlet 50 can be ignited through the ignition inlet 52. The air inlet 56 allows oxygen, necessary for the combustion process, to enter into the burn chamber 40 and thus permits regulation of the rate of combustion. The exhaust opening 60 allows the sulphur dioxide gas to pass up through the exhaust opening 60 and into the gas pipeline 70.

The gas pipeline 70 has two ends, the first end 78 communicating with the exhaust opening 60, the second end terminating at a third conduit 76. The gas pipeline or first conduit 70 may comprise an ascending pipe 72 and a transverse pipe 74. The ascending pipe 72 may communicate with the transverse pipe 74 by means a first 90 degree elbow joint. Disposed about and secured to the ascending pipe 72 is a protective grate 90 to prevent unintended external contact with member 72 which is hot when in use.

Water is conducted through a second conduit 282 to a point at which the second conduit 282 couples with the first conduit 70 at a third conduit 76.

Conduit 76 comprises a means 100 for bringing the sulphur dioxide gas in the first conduit and substantially all the water in second conduit 282 into contained codirectional flow whereby the sulphur dioxide gas and water are brought into contact with each other.

Figure 3:
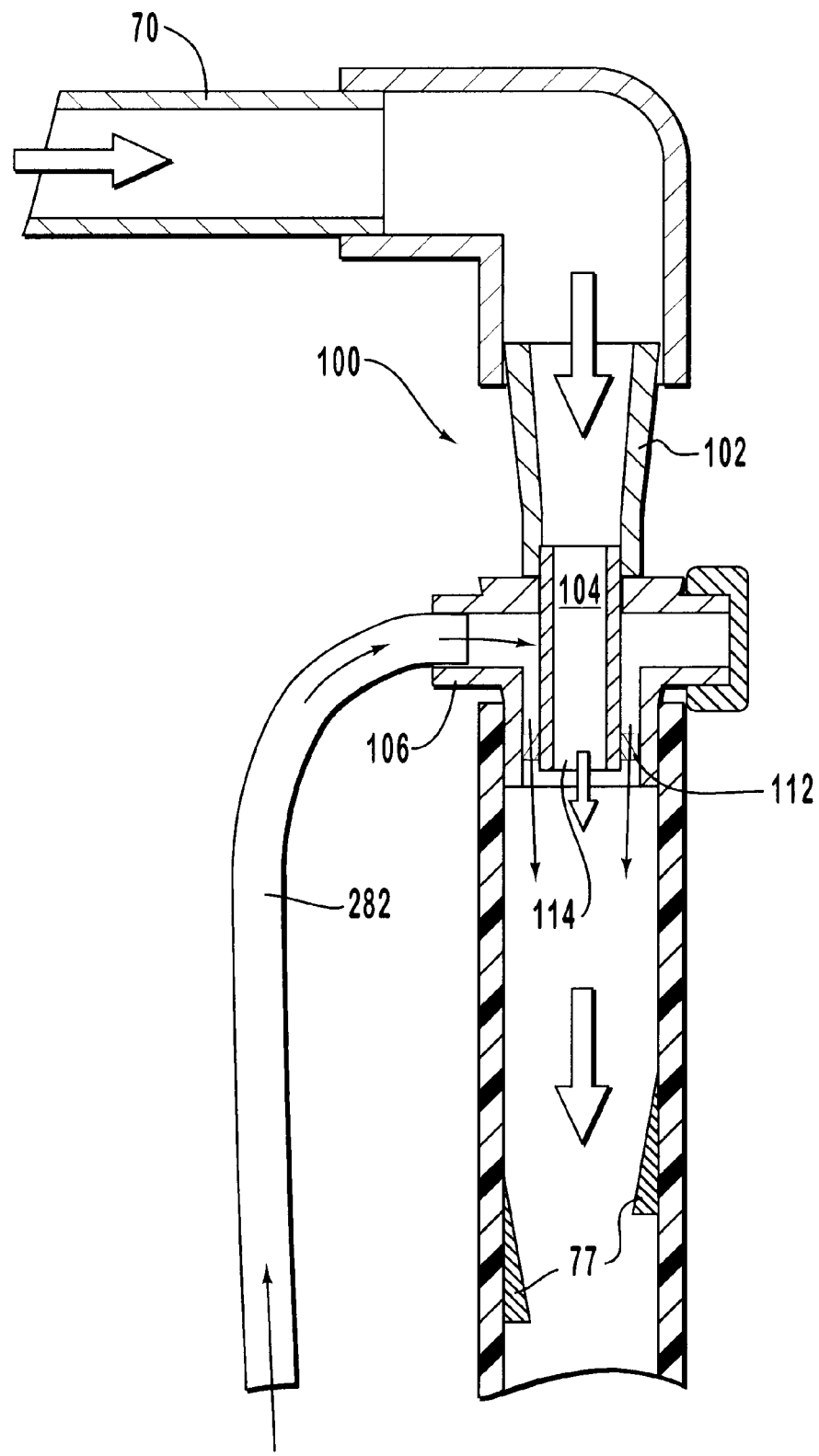
FIG. 3 is an enlarged view of a portion of a third conduit.

The codirectional flow means 100 shown in FIGS. 2 and 3, comprises a central body 102, the central body defining a gas entry 104 and a sulfur dioxide gas exiting outlet 114, the central body comprising a secondary conduit inlet 106, a cooling ring outlet 108, an emitter and an eductor 112. The eductor 112 generates an annular column of water to encircle gas exiting outlet 114. The water flow, thermal cooling and reaction are believed assist in drawing sulphur dioxide gas from the burn chamber 40 into the gas pipeline 70 where the gas is brought into contact with water to create sulphurous acid.

The codirection flow means 100 allows water to be introduced into the third conduit 76 initially through a second conduit inlet 106. The water entering the codirectional means 100 passes through the eductor 112 and, exits adjacent the sulphur dioxide gas outlet 114. The water enters the third conduit 76 and comes into contact with the sulphur dioxide gas by surrounding the sulphur dioxide gas where the sulphur dioxide gas and water are contained in contact with each other. The water and sulphur dioxide gas react to form an acid of sulphur. This first contact containment portion of conduit 76 does not obstruct the flow of the sulphur dioxide gas. It is believed that a substantial portion of the sulphur dioxide gas will react with the water in this first contact containment area.

After the acid and any host water (hereafter "water/acid") and any remaining unreacted gas continue to flow through third conduit 76, the water/acid and unreacted sulphur dioxide gas are mixed and agitated to further facilitate reaction of the sulphur dioxide with the water/acid. Means for mixing and agitating the flow of water/acid and sulphur dioxide gas is accomplished in a number of ways. For example, as shown in FIG. 2, mixing and agitating can be accomplished by changing the direction of the flow such as a bend 84 in the third conduit 76. Another example includes placing an object 77 inside the third conduit 76 to alter the flow pattern in the third conduit 76. This could entail a flow altering wedge, flange, bump or other member along the codirectional flow path in third conduit 76. By placing an object in the flow path, a straight or substantially straight conduit may be employed. The distinction of this invention over the prior art is mixing and agitating the flow of water/acid and sulphur dioxide involving substantially all of the water of the system with sulphur dioxide gas in an open codirectionally flowing system. One embodiment of the present invention can treat between 50 and 300 gallons of water per minute coursing through third conduit 76 being held in contained contact with the sulphur dioxide gas.

After the water/acid and sulphur dioxide gas have passed through an agitation and mixing portion of third conduit 76, the water/acid and unreacted sulphur dioxide gas are again contained in contact with each other to further facilitate reaction between the components to create an acid of sulphur. This is accomplished by means for containing the water/acid and sulphur dioxide gas in contact with each other. One embodiment is shown in FIG. 2 as a portion 85 of third conduit 76. Portion 85 acts much in the same way as the earlier described contact containment portion.

In a preferred embodiment, additional means for mixing and agitating the codirectional flow of water/acid and sulphur dioxide gas is employed. One embodiment is, illustrated as portion 86 of third conduit 76 in which again the directional flow of the water/acid and sulphur dioxide gas is directionally altered. In this way, the water/acid and sulphur dioxide gas are forced to mix and agitate, further facilitating reaction of the sulphur dioxide gas to further produce or concentrate an acid of sulphur.

Third conduit 76 also incorporates means for discharging the water/acid and unreacted sulphur dioxide gas before the various third conduit 76. One embodiment is shown in FIG. 2 as discharge opening 80 defined by third conduit 76. Discharge opening 80 is preferably positioned approximately in the center of the pooling section, described below. In the preferred embodiment, discharge 80 is configured so as to direct the discharge of water/acid and unreacted sulphur dioxide gas downward into a submersion pool 158 without creating a back pressure. In other words, discharge 80 is sufficiently close to the surface 133 of the fluid in the submersion pool to cause unreacted sulphur dioxide gas to be forced into the submersion pool, but not below the surface of the fluid in the submersion pool, thereby maintaining the open nature of the system and to avoid creating back pressure in the system.

The present invention also utilizes a tank 130 having a bottom 132, a tank sidewall 134, and a lid 164. Tank 130 may also comprise a fluid dispersion member 137 to disperse churning sulphurous acid and sulphur dioxide gas throughout tank 130. Dispersion member 137 may have a conical shape or any other shape which facilitates dispersion. A weir 148 may be attached on one side to the bottom member 132 and is attached on two sides to the tank sidewall 134. The weir 148 extends upwardly to a distance stopping below the discharge 80. The weir 148 divides the mixing tank 130 into a submersion pool 158 and an outlet section 152. The third conduit 76 penetrates the tank sidewall 134 at a point below the lid 164. An outlet aperture 154 is positioned in the tank sidewall 134 near the bottom member 132 in the discharge section. The drainage aperture 154 is connected to a drainage pipe 156. Drainage pipe 156 is adapted with a u-trap 157. U-trap 157 acts as means to force levels of gas of undissolved gas for sulphur dioxide gas back into chamber 130 to exit through lid 164 into vent conduit 210.

As sulphurous acid flows out of the third conduit 76, the weir 148 dams the acid coming into the mixing tank 130 creating a churning submersion pool 158 of sulphurous acid. Sulphur dioxide gas carried by but not yet reacted in the sulphurous acid is carried into submersion pool of acid 158 because of the proximity of the discharge 80 to the surface 133 of the pool 158. The carried gas is submerged in the churning submersion pool 158. The suspended gas is momentarily churned in contact with acid in pool 158 to further concentrate the acid. As unreacted gas rises up through the pool, the unreacted gas is held in contact with water and further reacts to further form concentrate sulphurous acid. The combination of the discharge 80 and its close proximity to the surface 133 of pool of acid 158 creates a means for facilitating and maintaining the submersion of unreacted sulphur dioxide gas discharged from the third conduit into the submersion pool of sulphurous acid to substantially reduce the separation of unreacted sulphur dioxide gas from contact with the sulphurous acid to promote further reaction of the sulphur dioxide gas in the sulphurous acid in an open system without subjecting the sulphur dioxide gas discharged from the third conduit to back pressure or system pressure. That is, discharge 80 positions below the level of the top of weir 148 is contemplated as inconsistent with an open system.

As sulphurous acid enters the mixing tank 130 from the third conduit 76 the level of the pool 132 of sulphurous acid rises until the acid spills over the weir 148 into the outlet section 152. Sulphurous acid and sulphur dioxide gas flow out of the mixing tank 130 into the drainage pipe 156. Drainage pipe 156 is provided with a submersion zone in the u-trap 157 in which sulphur dioxide gas is again mixed into the sulphurous acid and which prevents; sulphur dioxide gas from exiting the drainage pipe 156 in any significant amount.

Any free floating sulphur dioxide gas in mixing tank 130 rises up to the lid 164. The lid 164 defines an exhaust vent 202. Exhaust vent 202 may be coupled with a vent conduit 210. The vent conduit 210 has a first end which couples with the exhaust vent 202 and a second end which terminates at a fourth conduit 220. The vent conduit 210 may consist of a length a pipe between vent 202 and the fourth conduit 220. The fourth conduit 220 comprises auxiliary means 240 for bringing sulphur dioxide gas in the vent conduit and substantially all the water in a supplemental water conduit 294 into contained, codirectional whereby remaining sulphur dioxide gas and water are brought into contact with each other.

Figure 4:
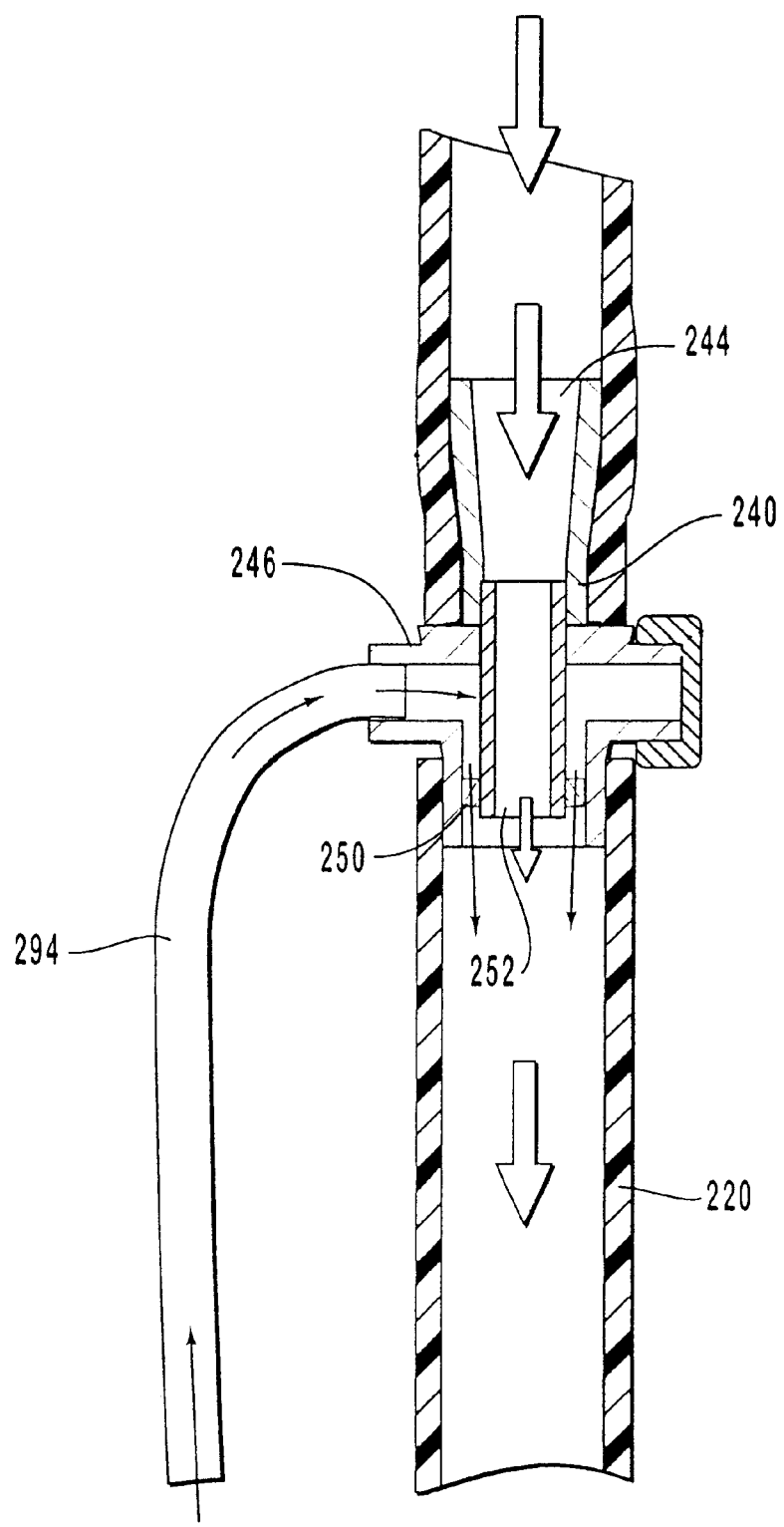
FIG. 4 is an enlarged view of a portion of a fourth conduit.
Figure 5:
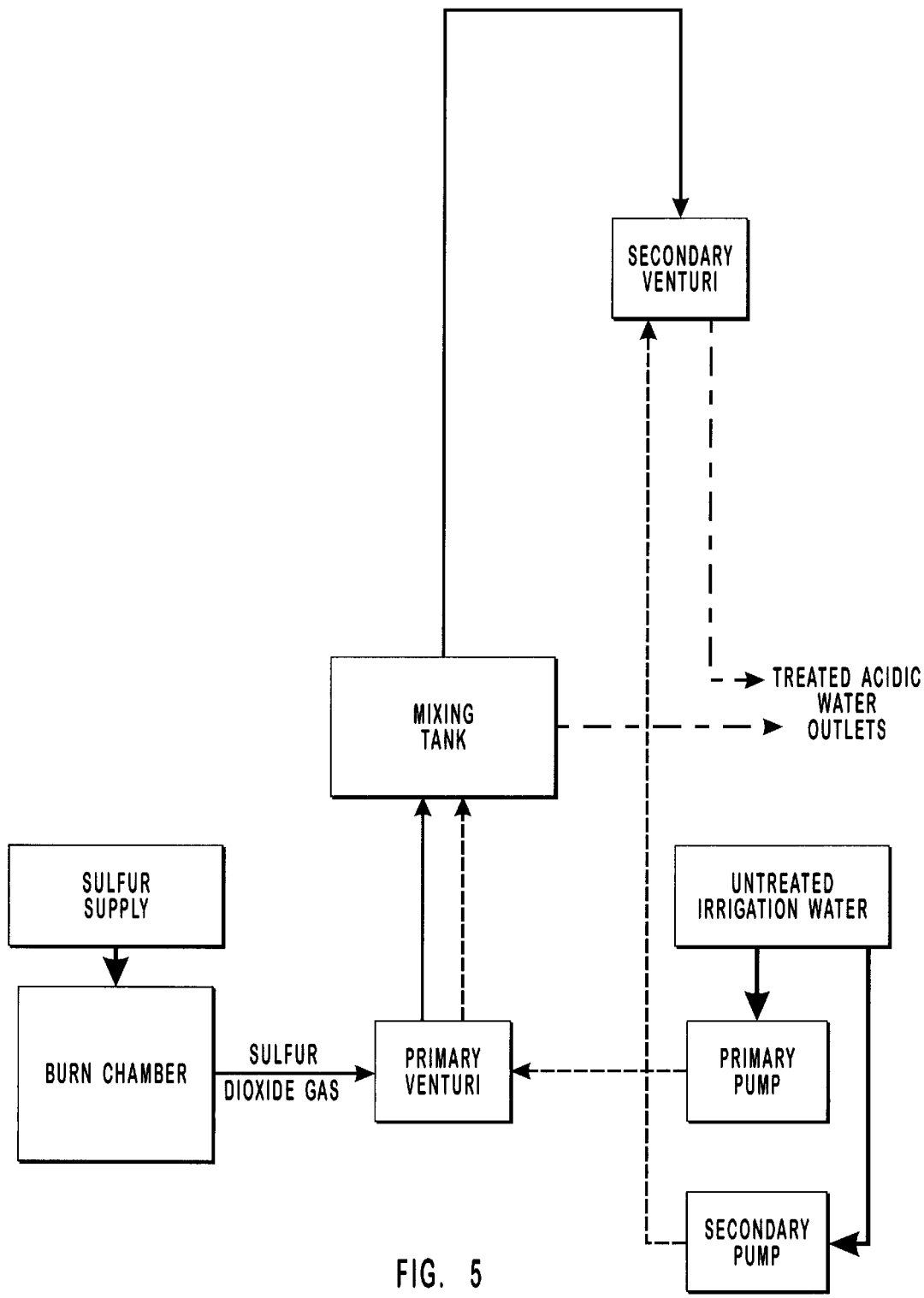
FIG. 5 is a flow chart explaining the inventive process.

As shown in FIGS. 2 and 4, the auxiliary means has a body 240 defining a gas entry 244, a gas outlet 252, a supplemental water conduit inlet 246, and water eductor 250.

Water enters the auxiliary means 240 through the supplemental water conoduit 294 at inlet 246. The water courses through the eductor as discussed earlier as to the codirectional means. The water eductor 250 draws any free floating sulphur dioxide gas into the exhaust vent conduit 210. Water and sulphur dioxide gas are brought into contact with each other in fourth conduit 220 by surrounding the gas with water. The water and gas are contained in contact with each other as the gas and water flow down through fourth conduit 220 to react and form an acid of sulphur. This contact containment area does not obstruct the flow of the sulphur dioxide gas. Substantially all of the sulphur dioxide gas in vent conduit 210 reacts with the water in this contact containment area.

In fourth conduit 220, the water/acid and unreacted or undissolved sulphur dioxide gas also experience one or more agitation and mixing episodes. For example, as water reenters fourth conduit 220 at inlet 262, the flow of water/acid and sulphur dioxide gas is mixed and agitated. The water/acid and sulphur dioxide gas are again contained in contact with each other thereafter. Another similar mixing and agitating episode occurs when the directional flow of the water/acid and sulphur dioxide gas is altered near discharge 264. As a result, like the water/acid and sulphur dioxide gas in the third conduit 76, the water/acid and sulphur dioxide gas in fourth conduit 220 may be subject to one or more contact containment portions and on or move agitation and mixing portions. The fourth conduit may have a u-trap 267. U-trap 267 acts as means to cause bubbles of unabsorbed diatomic nitrogen gas to be held on the upstream side of u-trap 267. Discharge 264 is also configured with a vent stack 265. Remaining diatomic nitrogen gas in the system is permitted to escape the system through vent stack 265. Operation of the system reveals that little, if any, sulphur dioxide escapes the system. It is believed that gas that is escaping the system is harmless diatomic nitrogen. This configuration of a sulphur acid generator eliminates the structure, expense and use of a counter current absorption tower of the prior art.

FIGS. 1, 2 and 3 show a primary pump 280 supplying water through a primary hose 282 to the secondary conduit water inlet 106 at codirectional means 100. In FIG. 2, a supplemental or secondary pump supplies water to auxiliary means 240 through a supplemental water conduit hose 294. It will be appreciated that any pump capable of delivering sufficient water to the system may be utilized and the pump may be powered by any source sufficient to run the pump. A single pump with the appropriate valving may be used or several pumps may be used. It is also contemplated that no pump is necessary at all if an elevated water tank is employed to provide sufficient water flow to the system or if present water systems provide sufficient water pressure and flow.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A sulphurous acid generator comprising:

a supply of sulphur dioxide gas conducted in a first conduit and means for drawing the sulphur dioxide gas through the first conduit;

a supply of water conducted in a second conduit; and a third conduit coupled to the first and second conduits comprising:
a blending portion, at least one contact containment portion, and at least one agitation portion,
the blending portion comprising means for bringing the sulphur dioxide gas in the first conduit and water from the second conduit into contained, codirectional flow whereby the sulphur dioxide gas and water are brought into contact with each other,
the contact containment portion(s) comprising a passageway through which the sulphur dioxide gas and the water codirectionally flow in contact with each other and in which at least a portion of the sulphur dioxide gas reacts with water to form sulphurous acid,
the agitation portion(s) comprising means for mixing and agitating the codirectionally flowing sulphur dioxide gas and water/sulphurous acid to facilitate the reaction and dispersement of sulphur dioxide gas with the water/sulphurous acid, and
means for discharging the sulphurous acid and unreacted sulphur dioxide gas from the third conduit the discharge means in communication with ambient pressure;
the first and third conduits defining an apparatus open to ambient pressure thereby avoiding subjecting the sulphur dioxide gas to a system pressure;
a mixing tank for further maintaining sulphur dioxide in contact with system fluid;
means for trapping undissolved gases from fluid discharged from the system;
means for facilitating and maintaining the submersion of unreacted sulphur dioxide gas discharged from the third conduit into a submersion pool of sulphurous acid to substantially reduce the separation of unreacted sulphur dioxide gas from contact with the sulphurous acid to promote further reaction of the sulphur dioxide gas into the sulphurous acid;
the mixing tank defining an outlet through which the sulphurous acid may pass to exit the mixing tank, the mixing tank, the facilitating and maintaining means, and the outlet subject to ambient pressure, thereby avoiding subjecting the sulphur dioxide gas to a system pressure, the mixing tank having a lid with an exhaust vent through which undissolved gases exit the mixing tank;
a supply of unreacted sulphur dioxide gas conducted in a vent conduit in communication with the exhaust vent and means for drawing the sulphur dioxide gas through the vent conduit;

a supply of water conducted in a supplemental water conduit;

a fourth conduit comprising:
- a blending portion, at least one contact containment portion, and at least one agitation portion;
  - the blending portion comprising means for bringing the sulphur dioxide gas in the vent conduit and water from the supplemental water conduit into contained, codirectional flow whereby the sulphur dioxide gas and water are brought into contact with each other,
  - the contact containment portion(s) comprising a passageway through which the sulphur dioxide gas and the water codirectionally flow in contact with each other and in which at least a portion of the sulphur dioxide gas reacts with the water to form sulphurous acid,
  - the agitation portion(s) comprising means for mixing and agitating the codirectionally flowing sulphur dioxide gas and water/sulphurous acid to facilitate the reaction and dispersement of sulphur dioxide gas into the water/sulphurous acid, and
- means for discharging the sulphurous acid and any unreacted sulphur dioxide gas the means for discharging having a submersion zone to substantially trap undissolved gases from passing from the system with the flow of discharged fluid.

* * * * *

UNITED STATES PATENT AND TRADEMARK OFFICE
CERTIFICATE OF CORRECTION

PATENT NO. : 6,080,368  
DATED : June 27, 2000  
INVENTOR(S) : Edward Jackson

Page 1 of 1

It is certified that error appears in the above-identified patent and that said Letters Patent is hereby corrected as shown below:

Column 1,
Lines 40-41, should read "principal means" instead of "principle means."

Column 2,
Line 25, should read: "present invention." instead of "present, invention."

Column 5,
Lines 62-63, should read: "principal elements" instead of "principle elements"

Column 6,
Lines 10-11, should read: "outlet 30 and a burn chamber inlet 50 of the burn chamber 40." instead of "outlet 30 a burn chamber inlet 50 of the bum chamber 40."

Column 8,
Line 62, should read: "which prevents sulphur dioxide gas" instead of "which prevents; sulphur dioxide gas"

Column 9,
Line 41, should read: "containment portions and one or more agitation" instead of "containment portions and on or move agitation"

Signed and Sealed this

Thirteenth day of November, 2001

*Attest:*

*Attesting Officer*

NICHOLAS P. GODICI
*Acting Director of the United States Patent and Trademark Office*